(12) United States Patent
Wu

(10) Patent No.: US 8,363,396 B2
(45) Date of Patent: Jan. 29, 2013

(54) POSITION-SHIFTING STRUCTURE

(75) Inventor: Tsung-Yin Wu, Taoyuan County (TW)

(73) Assignee: Hannstar Display Corp., Taipei County (TW)

( * ) Notice: Subject to any disclaimer, the term of this patent is extended or adjusted under 35 U.S.C. 154(b) by 322 days.

(21) Appl. No.: 12/952,643

(22) Filed: Nov. 23, 2010

(65) Prior Publication Data

US 2011/0267766 A1    Nov. 3, 2011

(30) Foreign Application Priority Data

Apr. 28, 2010   (TW) ................................ 99113587 A

(51) Int. Cl.
*G06F 1/16*        (2006.01)
(52) U.S. Cl. ................ 361/679.37; 312/330.1; 248/639; 200/332
(58) Field of Classification Search ............... 248/118.5, 248/918, 551, 371, 125.1, 639, 68.1, 422; 312/249.11, 249.8, 408, 9.12, 223.1, 223.2, 312/223.3, 228, 9.56, 334.28, 330.1, 231, 312/280; 200/5 A, 293.1, 332, 83 P, 85 R, 200/433; 700/90; 710/80; 361/679.55, 679.37, 361/679.33, 679.39, 679.13, 679.21, 679.01, 361/679.27, 679.09, 679.23, 679.29, 679.41, 361/679.43, 679.56, 679.45
See application file for complete search history.

(56) References Cited

U.S. PATENT DOCUMENTS

| | | | |
|---|---|---|---|
| 7,321,488 B2 * | 1/2008 | Ito et al. | 361/679.55 |
| 7,400,936 B2 * | 7/2008 | Chang | 700/90 |
| 2005/0038926 A1 * | 2/2005 | Chang | 710/8 |
| 2007/0159786 A1 * | 7/2007 | Liu et al. | 361/685 |

* cited by examiner

*Primary Examiner* — Hung Duong
(74) *Attorney, Agent, or Firm* — WPAT, P.C.; Anthony King

(57) ABSTRACT

A position-shifting structure includes a position-shifting frame and a base. The position-shifting frame includes two lateral wall portions and a handle portion. The two lateral wall portions are correspondingly provided with a notch and a mounting hole each and the notches contain bevel surfaces. The base has a receiving space symmetrically provided with two inward protrusions; and the position-shifting frame is connected to and seated in the receiving space with the mounting holes pivotally engaged with the protrusions. When the object is received in the receiving space, the notches are engaged with two lateral projections of the object. When the handle portion is upward pulled, the bevel surfaces drive the object to move from its initial position in the receiving space.

8 Claims, 4 Drawing Sheets

POSITION-SHIFTING STRUCTURE

FIELD OF THE INVENTION

The present invention relates to a position-shifting structure, and more particularly to a position-shifting structure having a position-shifting frame.

BACKGROUND OF THE INVENTION

According to the currently available techniques, the removal of a hard disk from a computer before the hard disk can be disconnected from corresponding computer cables would necessitate loosening of many screws, and some components or cables in the computer are subject to damage when the hard disk is removed from the computer using an improperly large force. Moreover, when a user tries to connect the removed hard disk to the computer again, it is uneasy to align and correctly connect the connectors on the hard disk with and to the connecting cables on the computer.

SUMMARY OF THE INVENTION

A primary objective of the present invention is to provide a position-shifting structure characterized by a position-shifting frame to enable easy and accurate connection and disconnection of two objects to and from each other.

To achieve the above and other objectives, the position-shifting structure provided according to an embodiment of the present invention includes a position-shifting frame and a base. The position-shifting frame includes two lateral wall portions and a handle portion transversely connected to and between the two lateral wall portions. The lateral wall portions and the handle portion are integrally formed. The two lateral wall portions are correspondingly provided with a notch and a mounting hole each, and the notches each contain a first and a second bevel surface. The base has a receiving space for receiving an object therein. The receiving space is symmetrically provided on two opposite lateral sides with two inward protrusions corresponding to the mounting holes on the position-shifting frame. The position-shifting frame is connected to and seated in the receiving space with the two mounting holes pivotally engaged with the two protrusions.

When the object is received in the receiving space, the notches on the position-shifting frame are adapted to engage with two lateral projections of the object to thereby hold the object to an initial position in the receiving space.

When the handle portion is upward pulled, the position-shifting frame is pivotally turned about the two protrusions in the base, bringing the first bevel surfaces of the two notches to press against the lateral projections of the object and thereby drive the object to move away from its initial position in the receiving space.

The handle portion of the position-shifting frame further includes an inclined grip plate outward and upward extended from the handle portion at a predetermined angle. A user can pull or push the handle portion by applying a pull force or a push force at the grip plate. When it is necessary to replace the removed object on its initial position in the receiving space of the base, simply engage the two notches on the position-shifting frame with the two lateral projections on the object and then downward push the handle portion at the grip plate, so that the notches on the position-shifting frame are brought to move downward with the second bevel surfaces pressed against the lateral projections of the object. As a result, the object is driven by the position-shifting frame to shift back to its initial position in the receiving space.

With the above arrangements, the position-shifting structure of the present invention provides one or more of the following advantages:

(1) When the position-shifting structure is used to connect or disconnect a hard disk to or from a computer, the hard disk can be removed from the computer without the need of loosening a large number of screws.

(2) When the position-shifting structure is used to connect or disconnect a hard disk to or from a computer, internal components of the computer can be protected against damage possibly caused by removing the hard disk from the computer with an excessively large force.

(3) When the position-shifting structure is used to connect or disconnect a hard disk to or from a computer, the removed hard disk can be easily moved back to its original position for the connectors thereof to electrically connect to the connecting cable in the computer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
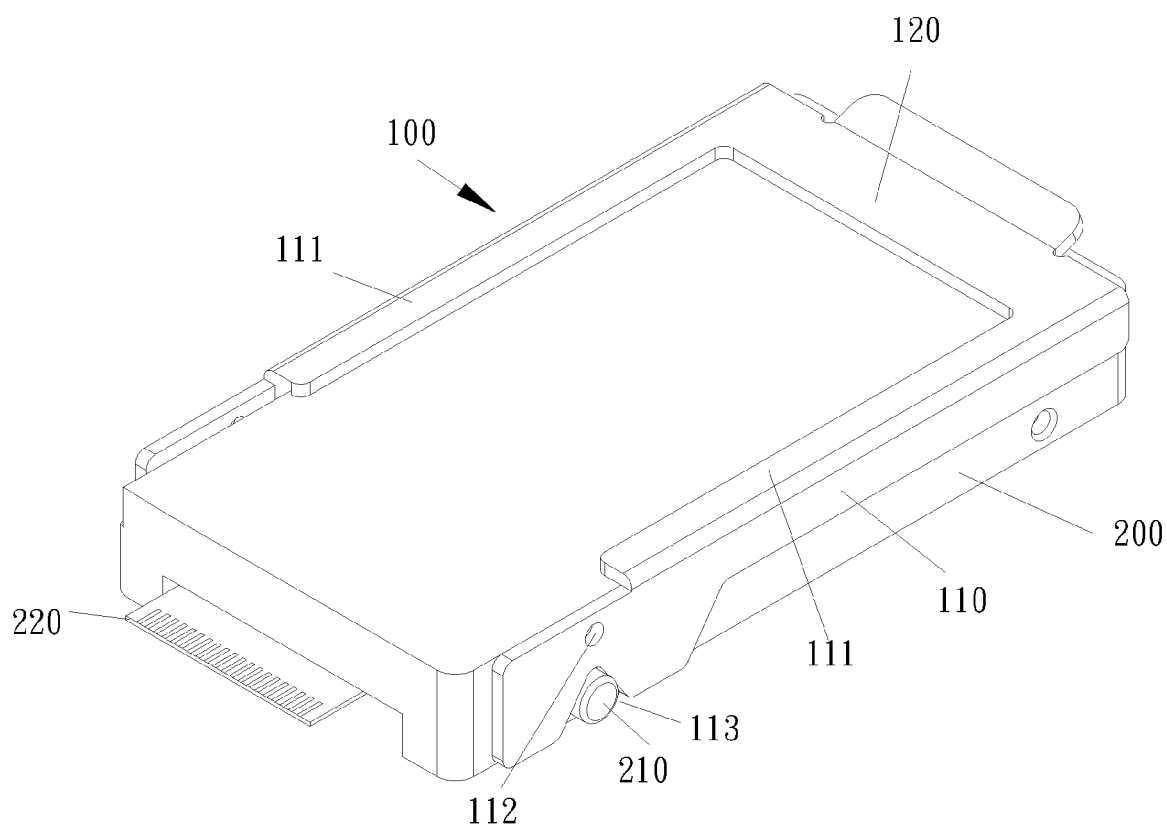
FIG. 1A shows a position-shifting frame of the position-shifting structure of the present invention with the position-shifting frame being covered on an object to be shifted in position.

The present invention will now be described with a preferred embodiment thereof by reference to the accompanying drawings. For the purpose of easy to understand, elements that are the same in the preferred embodiment are denoted by the same reference numerals.

Figure 1B:
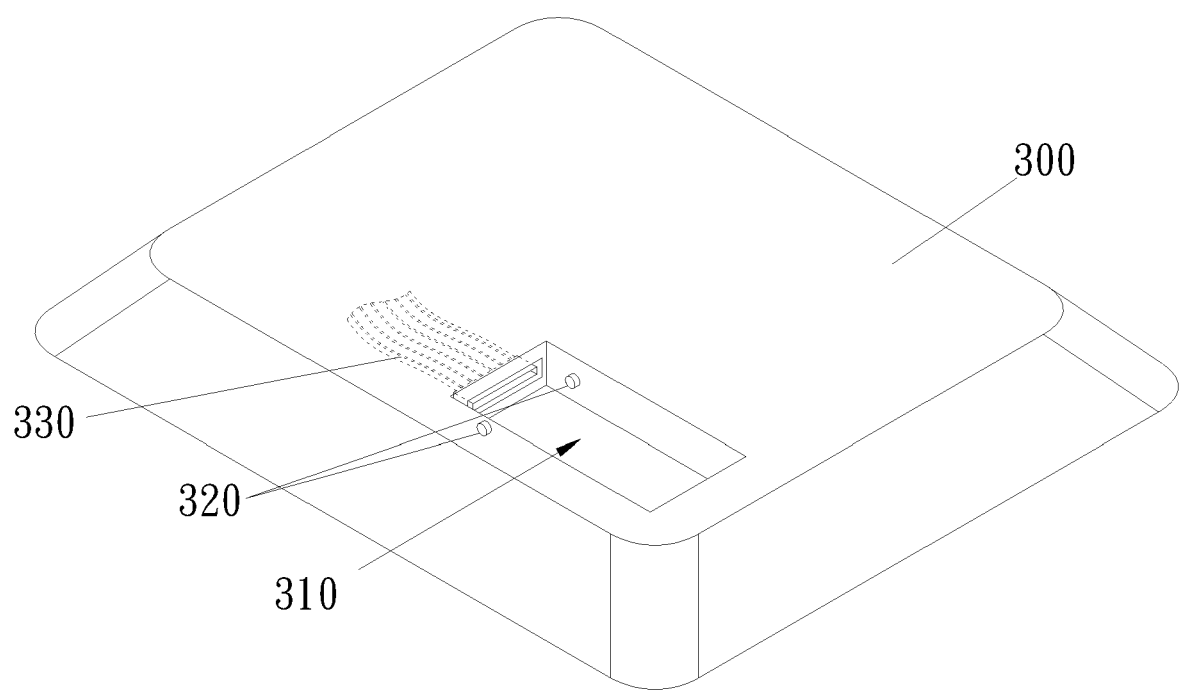
FIG. 1B shows a base of the position-shifting structure of the present invention.
Figure 1C:
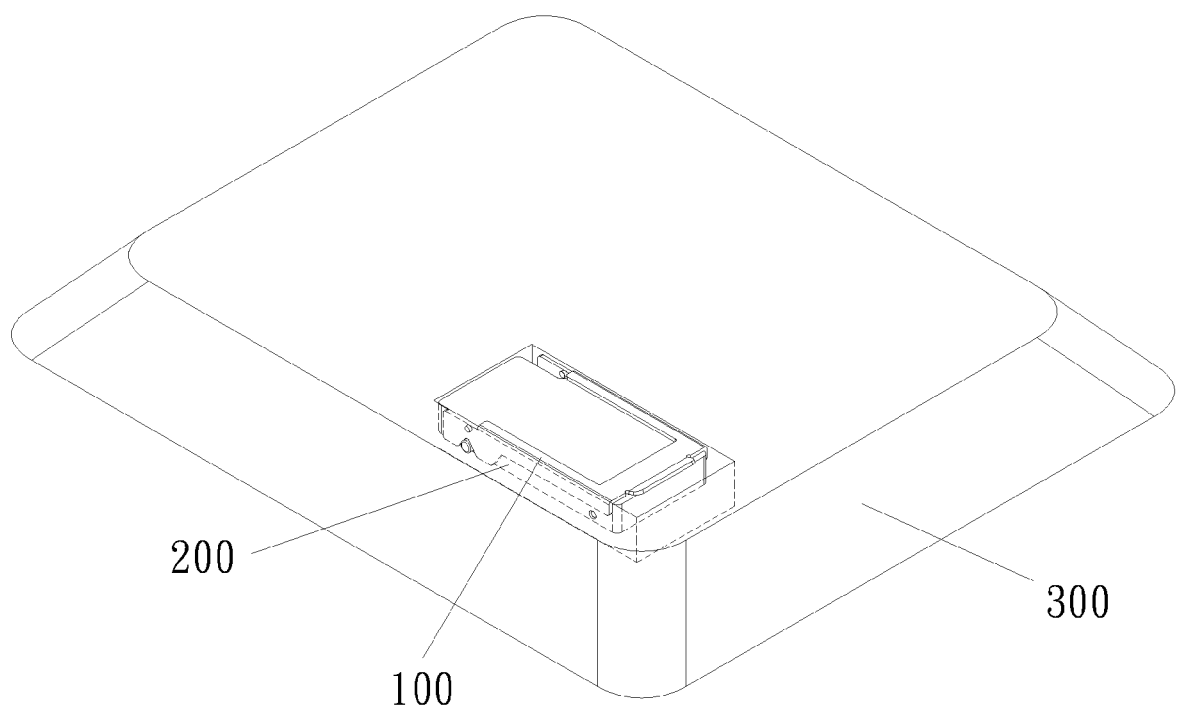
FIG. 1C is an assembled perspective view of the position-shifting structure of the present invention.

Please refer to FIG. 1A to FIG. 1C that is a position-shifting frame, a base, and an assembled perspective views of the position-shifting structure according to a preferred embodiment of the present invention. As shown, the position-shifting structure is designed for shifting an object 200 to a predetermined position, and includes a position-shifting frame 100 and a base 300. Please refer to FIG. 1A that shows the position-shifting frame 100 being covered on the object 200 to be shifted in position. As shown, the position-shifting frame 100 includes two lateral wall portions 110 and a handle portion 120. The lateral wall portions 110 and the handle portion 120 are formed into one integral unit with the handle portion 120 transversely extended between and connected to the two lateral wall portions 110. The two lateral wall portions 110 are correspondingly provided at predetermined positions with a notch 113 and a mounting hole 112 each. The notches 113 are separately located below the mounting holes 112. Each of the notches 113 is a structure containing bevel surfaces. In the illustrated embodiment of the present invention, the bevel surfaces of each notch 113 give the notch 113 a configuration similar to a reverse letter V. However, it is understood the notches 113 can be otherwise configured in other embodiments without being limited to the form of a reverse letter V.

Please refer to FIG. 1B that shows the base 300 of the position-shifting structure of the present invention. As shown, the base 300 has a receiving space 310 provided thereon at a predetermined position for receiving the object 200 therein. The receiving space of the base 300 is symmetrically provided at two lateral sides with two inward protrusions 320. The protrusions 320 correspond to the two mounting holes 112 on the position-shifting frame 100. The position-shifting frame 100 is connected to the base 300 and seated in the receiving space 310 by pivotally engaging the two mounting holes 112 with the two protrusions 320. In particular, the two protrusions 320 are pivotally connected to the mounting holes 112 by way of loose fit.

The object 200 is symmetrically provided at two lateral sides with two laterally outward extended projection 210. By means of separately engaging the lateral projections 210 of the object 200 with the two notches 113 of the position-shifting frame 100, the object 200 can be received in the receiving space 310 of the base 300 and held to an initial position. The two lateral wall portions 110 of the position-shifting frame 100 each further include an extension portion 111. The extension portions 111 each have a predetermined length and are inward projected from the two lateral wall portions 110 toward each other, so as to partially cover and thereby confine the object 200 in below the position-shifting frame 100. In the illustrated embodiment of the present invention, the object 200 is a hard disk provided at one end with a plurality of connectors 220. When the hard disk is disposed in the receiving space 310 and held to the initial position by the position-shifting frame 100, the connectors 220 on the hard disk can be electrically connected to a connecting cable 330 in a computer (see FIG. 1B). However, it is understood the object 200 is not necessary a hard disk and the position-shifting structure is not necessarily configured for use only with a computer to shift the hard disk to desired positions.

Figure 2:
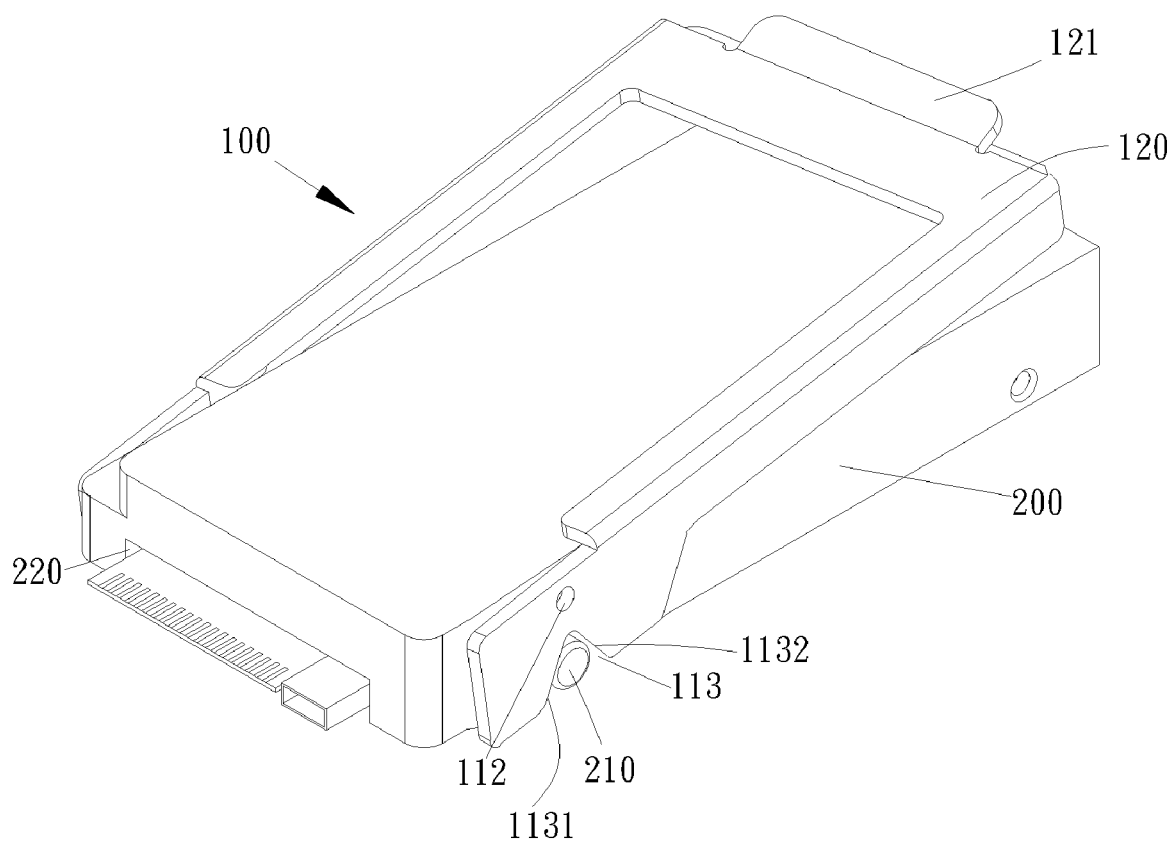
FIG. 2 shows the manner of using the position-shifting structure of the present invention.

Please also refer to FIG. 2 that shows one manner of using the position-shifting structure of the present invention. As shown, when the handle portion 120 is pulled upward, the position-shifting frame 100 is caused to pivotally turn about the two protrusions 320 (see FIG. 1B), bringing the handle portion 120 and the two notches 113 on the position-shifting frame 100 to turn at the same time. At this point, two first bevel surfaces 1131 of the two notches 113 farther from the handle portion 120 would be brought to press against the two lateral projections 210 of the object 200 and thereby drive the object 200 to move away from its initial position in the receiving space 310. In the case of a hard disk, when the hard disk is moved away from its initial position, the connectors 220 thereof would be disconnected from the connecting cable 330 in the computer, enabling the hard disk to be easily removed from the computer.

The handle portion 120 of the position-shifting frame 100 further includes an inclined grip plate 121, which is outward upward extended from the handle portion 120 at a suitable angle for a user to pull or push. Thus, when it is desired to pull the handle portion 120 upward, the user can simply apply a pull force at the inclined grip plate 121. When the user needs to replace the removed object 200 to its initial position in the receiving space 310, the user can simply engage the two notches 113 of the position-shifting frame 100 with the two lateral projections 210 of the object 200, and then downward pushes the handle portion 120 at the inclined grip plate 121, so that the position-shifting frame 100 is pivotally turned about the two protrusions 320, bringing the handle portion 120 and the notches 113 to turn and move downward at the same time. At this point, second bevel surfaces 1132 of the two notches 113 of the position-shifting frame 100 closer to the handle portion 120 would press against the lateral projections 210 of the object 200 and thereby drive the object 200 to move toward its initial position in the receiving space 310. In the case of a hard disk, when the hard disk is driven back to the initial position in the receiving space 310 on the base 300, the connectors 220 on the hard disk would be electrically connected to the connecting cable 330 of the computer again.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A position-shifting structure for shifting an object, the position-shifting structure comprising:
   a position-shifting frame having two lateral wall portions and a handle portion, the two lateral wall portions each having a notch and a mounting hole, the handle portion being connected collectively to the two lateral wall portions, and the two notches formed on the position-shifting frame each containing two bevel surfaces; and
   a base being having a receiving space, the receiving space being symmetrically provided at two lateral sides with two inward protrusions, the protrusions being corresponding to the two mounting holes on the position-shifting frame, and the position-shifting frame being connected to the base and seated in the receiving space by pivotally engaging the two mounting holes with the two protrusions.

2. The position-shifting structure as claimed in claim 1, wherein the handle portion of the position-shifting frame further includes an inclined grip plate outward extended from the handle portion.

3. The position-shifting structure as claimed in claim 1, wherein the two lateral wall portions of the position-shifting frame each further include an extension portion, and the extension portions each having a predetermined length and being projected from the two lateral wall portions toward each other.

4. The position-shifting structure as claimed in claim 3, wherein the extension portions are adapted to partially cover and fix the object.

5. The position-shifting structure as claimed in claim 1, wherein the object is provided on two lateral sides with two laterally outward extended projections.

6. The position-shifting structure as claimed in claim 5, wherein the two notches on the position-shifting frame are adapted to engage with the two lateral projections of the object.

7. The position-shifting structure as claimed in claim 1, wherein the two notches on the position-shifting frame are separately located below the two mounting holes.

8. The position-shifting structure as claimed in claim 1, wherein the two lateral wall portions and the handle portion are integrally formed into one unit.

* * * * *